Dec. 4, 1923.
T. M. FEDER
1,476,289
LIQUID LEVEL INDICATOR
Filed Dec. 13, 1921
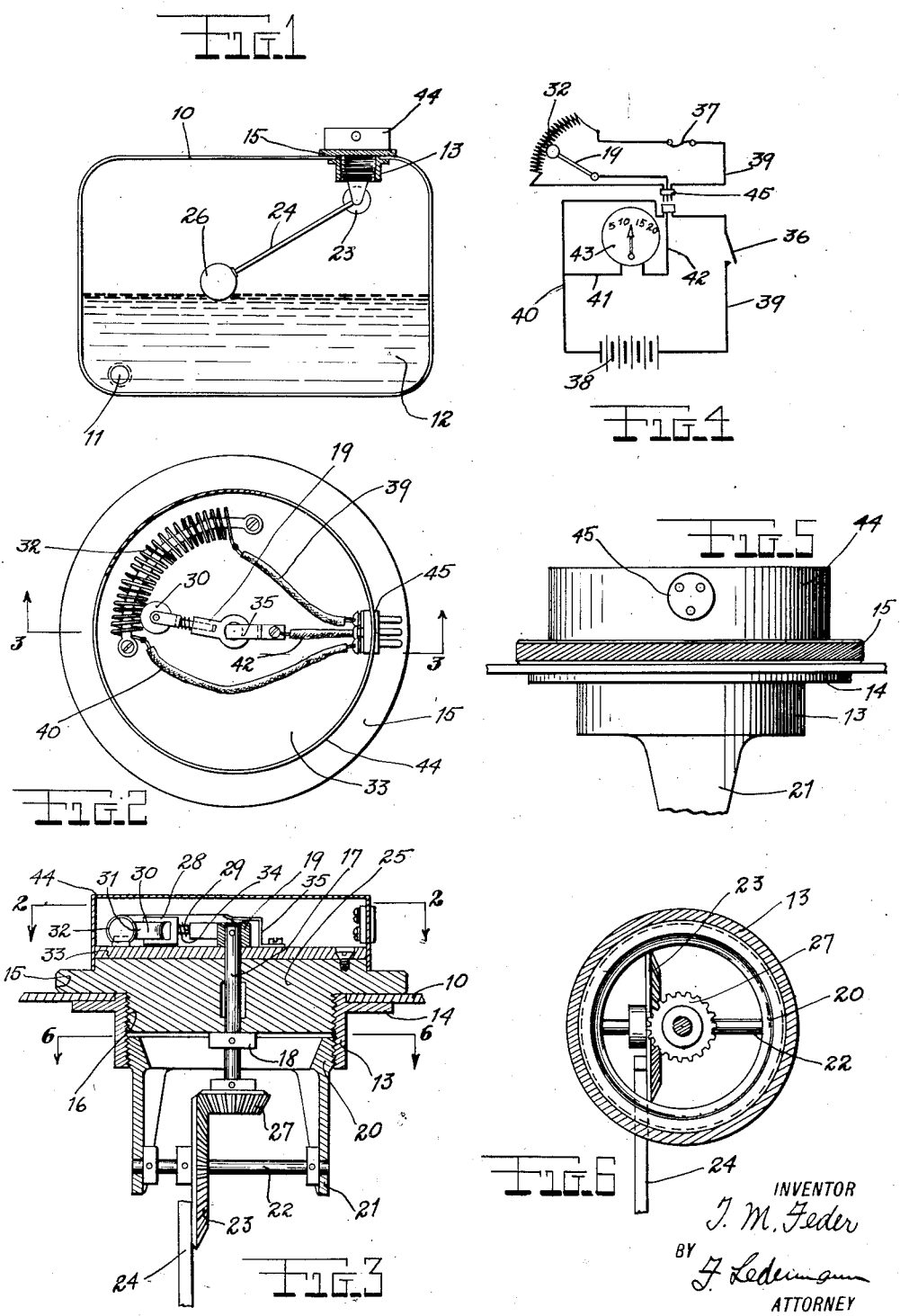
INVENTOR
T. M. Feder
BY
J. Lederman
ATTORNEY Patented Dec. 4, 1923.

1,476,289

UNITED STATES PATENT OFFICE.

TOBIAS M. FEDER, OF NEW YORK, N. Y.

LIQUID-LEVEL INDICATOR.

Application filed December 13, 1921. Serial No. 522,193.

*To all whom it may concern:*

Be it known that I, TOBIAS M. FEDER, a citizen of the United States, residing at New York, in the county of New York and State of New York, have invented certain new and useful Improvements in Liquid-Level Indicators, of which the following is a specification.

This invention relates to liquid level indicators and has particular reference to that type used in conjunction with an automobile gasoline supply tank, the main object being, to provide means actuated by the fluctuation of liquid which will be registered on an indicator.

Another object is to have the actuated means electrically connected to the same, thus enabling the indicator to be placed in any position considered convenient.

A further object is to provide a device constructed in such manner as to be interchangeable with the usual size of tank plug, and designed to prevent sparking within the tank chamber.

These and other objects will become apparent in the description below in which similar characters of reference refer to like-named parts in the drawing, in which—

Figure 1 represents an automobile fluid supply tank and illustrates the level in position.

Figure 2 is a sectional plan view of the device taken on line 2—2 of Figure 3.

Figure 3 is a sectional elevation taken on line 3—3 Figure 2.

Figure 4 is a wiring diagram of the complete device.

Figure 5 is a side elevation of the device.

Figure 6 is a cross section taken on line 6—6 of Figure 3.

Referring more in detail to the drawing, the numeral 10 represents a conventional form of fuel tank employed on automobiles, and has an outlet hole 11 thru which the liquid fuel 12 passes to the engine in the well known manner.

An internally threaded sleeve 13 having a flange 14 is permanently secured to the tank and a solidly formed cap 25 having a knurled rim 15 and a threaded neck 16 engages the threads of the sleeve forming a water tight fit therewith. A short shaft 17 rotatably mounted in the cap 25 has a lever 19 and a collar 18 secured thereto forming positioning members for the shaft.

A threaded ring 20 having downwardly directed extensions 21 is secured in sleeve 13. Holes located near the end of extensions 21 and aligned with each other receive the ends of a spindle 22 rotatably mounted therein. A bevel gear 23 fixed to spindle 22 has a stem 24 fixed thereto and provided with a hollow spherical float 26 at its end. It is to be understood that by separating the device into two units, the lower unit 20 with its component parts can be permanently secured in place thus making it unnecessary to lift the delicately constructed float out of the tank when filling the same and endangering the float.

It further becomes obvious as the liquid 12 slowly exhausts from the tank, the float 26, riding on the surface thereof, will rotate gear 23. This rotation is transmitted to shaft 17 by the pinion 27 which will in turn rotate lever 19 fixed to the upper end of shaft 17. A yoke 28 having a squared shank 29 slidably engages a hole in the end of lever 19. Yoke 28 receives a roller 30 having a concavely curved periphery 31 which lies in contact with a portion of electrical resistance coil 32. Said coil is anchored to the insulation plate 33 and describes an arcuate course so that roller 30 will always be in contact with some point thereon. In order to insure contact between the roller and coil, a spring 34 is provided between the yoke 28 and lever 19.

Resistance coil 32 is connected in series to a battery or other source 38 by leads 39 and 40. Fuse plug 37 and cutout switch 36 are connected to lead wire 39 in the usual manner. A common type of voltmeter 43 having a dial graduated to read gallons or the equivalent is secured to the automobile dashboard or at any other convenient place. Lead wire 42 in contact with lever 19 thru the medium of the spring terminal 35 shunts an electrical circuit from the coil 32 thru the voltmeter from whence the current returns to the main circuit thru lead wire 41.

Lever and coil members are enclosed by a protective shell 44 tightly fitting over the cap flange.

When filling the tank, cap 15 is withdrawn from the sleeve after the triple pole plug 45, attached to shell 44, has been disengaged from its corresponding plug secured to the remaining circuit in the manner shown in Figure 4.

The yoke carried by the lever is manually rotated in a clockwise direction to the end of the coil 32, in which position it will correspond to the reading of the voltmeter 43, to indicate that the tank is filled.

I claim:

A rheostat comprising a circular insulator, a spindle rotatably mounted axially in said insulator, a concentric resistance coil fixed on said insulator, a lever fixed to said spindle, having a square hole at its outer end, a shank slidable in said hole, a yoke rigid with said shank, a roller having a concave periphery adapted to contact with the coil convolutions carried by said yoke, a spring adapted to urge said roller against the convolutions of said resistance coil, and means for actuating said spindle.

In witness whereof I affix my signature.

TOBIAS M. FEDER.